(12) United States Patent
Wallace

(10) Patent No.: US 8,456,471 B2
(45) Date of Patent: Jun. 4, 2013

(54) POINT-CLOUD CLIP FILTER

(75) Inventor: William Edward Wallace, Pleasanton, CA (US)

(73) Assignee: Leica Geosystems, Heerbrugg (CH)

( * ) Notice: Subject to any disclaimer, the term of this patent is extended or adjusted under 35 U.S.C. 154(b) by 1077 days.

(21) Appl. No.: 12/198,854

(22) Filed: Aug. 26, 2008

(65) Prior Publication Data

US 2010/0053163 A1    Mar. 4, 2010

(51) Int. Cl.
*G06T 15/10* (2011.01)

(52) U.S. Cl.
USPC ........................................................ 345/427

(58) Field of Classification Search
USPC ........................................... 715/806; 345/427
See application file for complete search history.

(56) References Cited

U.S. PATENT DOCUMENTS

| | | | |
|---|---|---|---|
| 4,685,070 A * | 8/1987 | Flinchbaugh | 345/424 |
| 6,330,523 B1 | 12/2001 | Kacyra et al. | |
| 2005/0223337 A1 * | 10/2005 | Wheeler et al. | 715/806 |
| 2007/0171220 A1 | 7/2007 | Kriveshko | |
| 2008/0036758 A1 * | 2/2008 | Carpenter et al. | 345/419 |
| 2008/0036766 A1 * | 2/2008 | Ishii et al. | 345/427 |
| 2008/0049012 A1 * | 2/2008 | Bar-Joseph et al. | 345/419 |

FOREIGN PATENT DOCUMENTS

WO    2005088558 A1    9/2005

OTHER PUBLICATIONS

KNITIX, 3D Studio Max User's Guide, Kinetix, Mar. 15, 1996, vol. 1, pp. 1-460.
European Search Report dated May 19, 2011 as received in related European patent application No. 09 16 8577.

\* cited by examiner

*Primary Examiner* — Edward Martello
(74) *Attorney, Agent, or Firm* — Maschoff Brennan

(57) ABSTRACT

A viewer renders a first image from a point cloud of data of a scanned scene accessed from a data store. A region of interest may then be defined. In response, the image is updated to only include data included within the region of interest. Alternatively, the region of interest may be provided to a second viewer, where a second image is rendered or updated to only include data included within the region of interest.

28 Claims, 13 Drawing Sheets

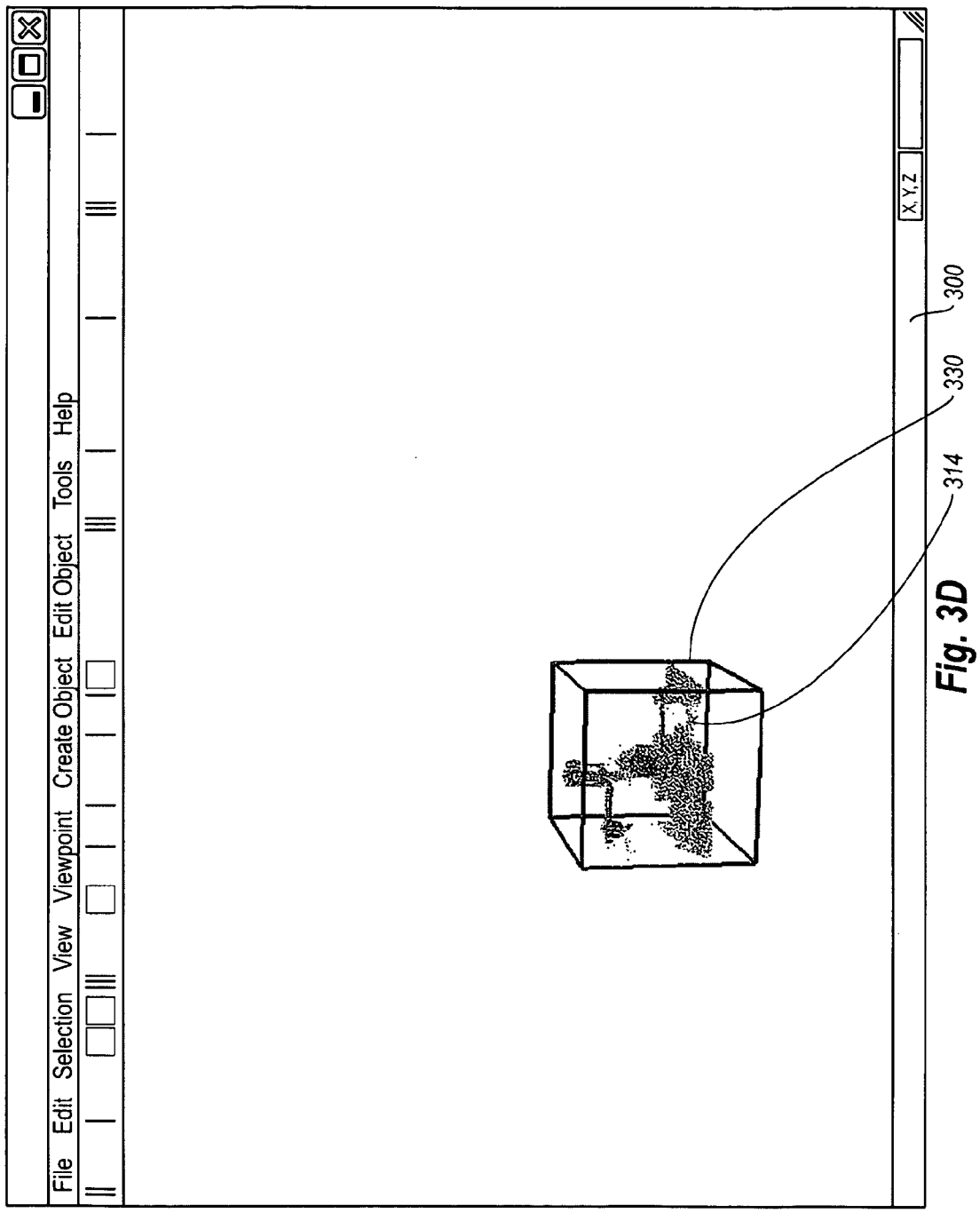

POINT-CLOUD CLIP FILTER

CROSS-REFERENCE TO RELATED APPLICATIONS

Not applicable.

BACKGROUND

A laser scanner collects data about its surroundings by collecting thousands, millions or even billions of data points of three-dimensional position information. One innovative laser scanner system for collecting such data points is described in U.S. Pat. No. 5,988,862, which is incorporated herein by reference in its entirety. Other systems meeting this description include the Leica HDS6000 laser scanner from Leica Geosystems HDS, LLC, of San Ramon, Calif., or other LIDAR systems-such as the airborne LIDAR system disclosed in U.S. patent application Ser. No. 11/397,246 filed Apr. 4, 2006, and incorporated herein by reference in its entirety. The data points, which together are called a point cloud when viewed on or manipulated by a computer, can be collected so densely that they effectively re-create a scene like a photograph. This allows laser scanner users to use the point clouds to view scenes and collect measurements from the point cloud.

The collected point cloud is typically stored in a data store, which is accessible to software packages that render the point cloud viewable on a computer. That is, the software packages recreate the scanned scenes on the computer screen so that the user may view the scanned scene. Some software packages allow the user to manipulate the scanned image as desired.

However, a point cloud is often comprised on multiple scans from different locations or viewpoints that have then been combined in a single coordinate system. When such a point cloud is then rendered as an image by the software packages, the resulting image may be very difficult for the user to understand or interpret. This is often because the resulting image includes elements from several points of view. Said another way, scanned elements that would be occluded from view if the point cloud only included data points taken at a first point of view or location are included in the rendered image as the image includes data points from multiple additional points of view or locations. The scans at the additional view points or locations include the elements occluded from the first view or location. For example, a rendered image may show distant points in between closer points since there is not a surface to occlude the more distant points. As may be appreciated, this may confuse the user who is viewing the scene.

BRIEF SUMMARY

One embodiment disclosed herein relates to a method for defining a clip region of an image of a second viewer using an image of a first viewer. The method may be implemented in a system that includes the first viewer and the second viewer that are configured to render point cloud data collected from a laser scan as a viewable image. The method comprises rendering at a first viewer a first image from a point cloud of data of a scanned scene accessed from a data store, the first image representing one or more scans from a single scan position, wherein the first image, when rendered, is viewed from the point of view of a laser scanner performing the scan such that data occluded from the laser scanner point of view is not included in the first image, specifying a clip volume, selecting a specific point of the first image to define an region of interest, wherein the region of interest includes the specific point and also includes all data points within the region of the specified clip volume, providing the region of interest to a second viewer, and rendering at the second viewer a second image from the point cloud of data of the scanned scene accessed from the data store, the second image representing one or more scans from one or more scan positions, the second image comprising the selected specific point and those data points that are included within the region of interest.

Another embodiment disclosed herein relates to a method for defining a clip region. The method may be implemented in a system that includes a viewer configured to render point cloud data from a laser scanner as a viewable image. The method comprises rendering on a viewer an image from a point cloud of data representing at least one point of a scanned scene, specifying a clip volume, selecting a specific point of the image to define an region of interest, wherein the region of interest includes the selected point and includes all data points within the region of the specified clip volume, and updating the rendered image such that only that portion of the rendered image included in the region of interest is displayed on the viewer.

An additional embodiment disclosed herein relates to a system for rendering images from point cloud data collected in a laser scan. The system comprises a data store configured to store point cloud data of a scene collected by a laser scanner, a first viewer configured to render a first image of the point cloud data stored in the data store, the first image representing one or more scans from a single scan position, wherein the first image, when rendered, is viewed from the point of view of a laser scanner performing the scan such that data occluded from the laser scanner point of view is not included in the first image, a second viewer configured to render a second image of the point cloud data stored in the data store, the second image representing one or more scans from one or more scan positions, wherein defining an region of interest in the first viewer that specifies a portion of the first image causes the second viewer to render the second image such that the second image only includes data that is within the region of interest.

Additional features and advantages will be set forth in the description which follows, and in part will be obvious from the description, or may be learned by the practice of the teaching herein. The features and advantages of the teaching herein may be realized and obtained by means of the instruments and combinations particularly pointed out in the appended claims. These and other features will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIGS. 3A-3D illustrate an example first and second viewer in accordance with the embodiments disclosed herein;

FIGS. 4A-4C illustrate an alternative example first and second viewer in accordance with the embodiments disclosed herein;

DETAILED DESCRIPTION

The principles of the embodiments described herein describe the structure and operation of several examples used to illustrate the present invention. It should be understood that the drawings are diagrammatic and schematic representations of such example embodiments and, accordingly, are not limiting of the scope of the present invention, nor are the drawings necessarily drawn to scale. Well-known devices and processes have been excluded so as not to obscure the discussion in details that would be known to one of ordinary skill in the art.

Embodiments disclosed herein relate to a quick and efficient way to create a clip filter for a rendered image of scanned data. In one embodiment a first viewer shows a rendered image from a single point of view. Accordingly, the image is easy for a user to understand and interpret. The user may then select a specific point of the image using a computer mouse or other user interface device. The selection of the point defines a region of interest that includes the selected point and a specified clip volume. This region of interest may then be used to filter out unwanted data in a second viewer or in the first viewer. For example, the second viewer may render an image that only includes the selected point and any data included within the clip volume comprising the region of interest.

Figure 1A:
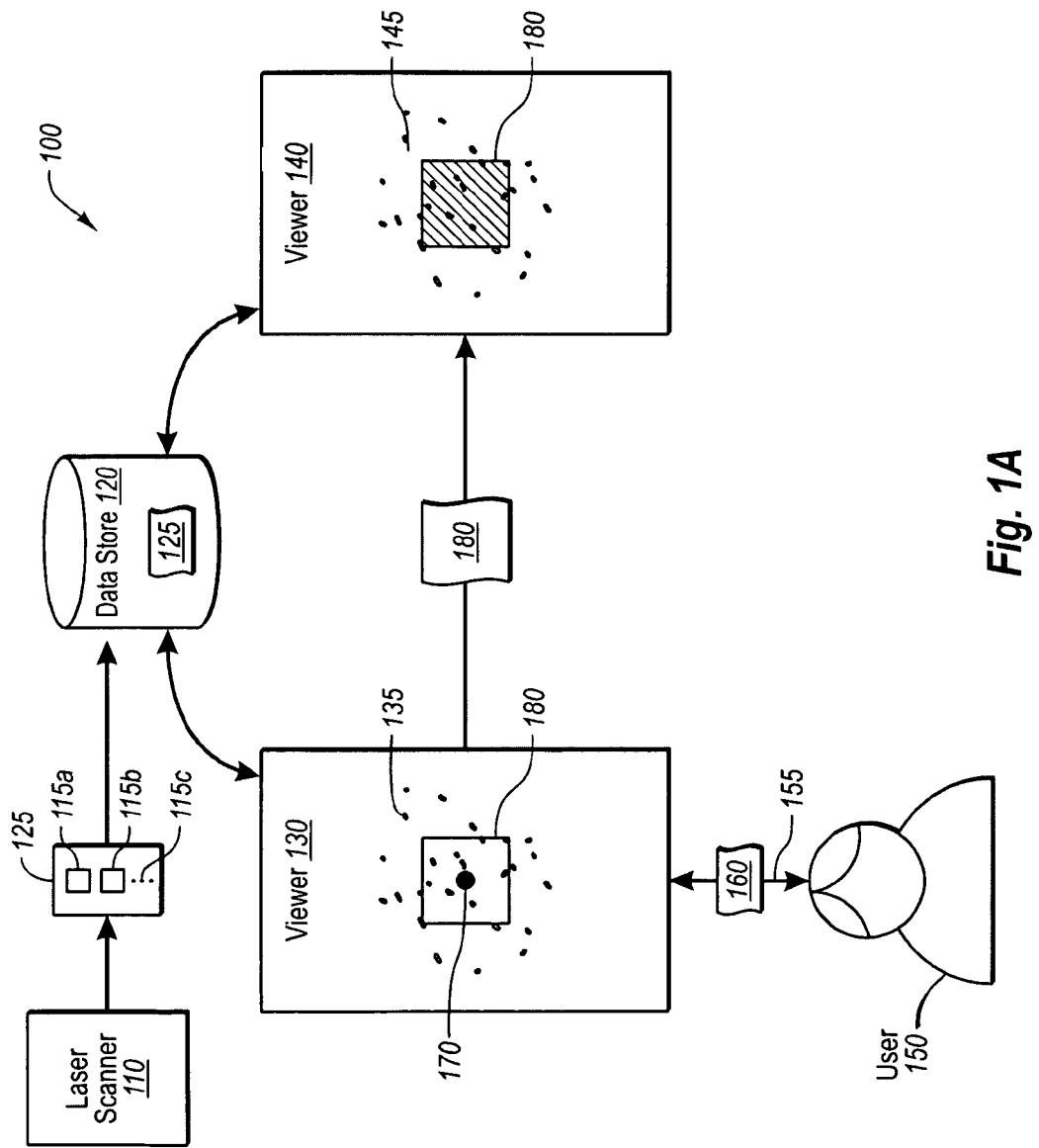
FIG. 1A illustrates an environment in which embodiments of the present invention may be practiced.

Reference is now made to FIG. 1A, which illustrates an environment 100 in which embodiments of the present invention may be practiced. It will be appreciated, however, that the environment 100 of FIG. 1A is only one of numerous environments that may be implemented.

As shown, a laser scanner 110 may be employed to collect data about its surroundings by collecting data points of three-dimensional position information. The laser scanner 110 may correspond to the laser scanner of U.S. Pat. No. 5,988,862 and the Leica HDS6000 laser scanner from Leica Geosystems. Of course, it will be appreciated that laser scanner 110 may be any other suitable laser scanner.

The laser scanner 110 may make multiple scans when collecting the data points. For example, a scan taken at a first location may produce data points 115a while a scan taken at a second location may produce data points 115b. Alternatively, a first scan may be taken at a first location to produce data points 115a while a second scan taken at the same location may produce data points 115b. The ellipses 115c represent the data points that may be taken at any number of multiple locations as needed. Of course, it will be appreciated that in some embodiments only a scan at the first point of view and/or location need be taken.

In some embodiments, the laser scanner 110 may also include one or more cameras that are configured to take one or more pictures of the area that is being scanned by the laser scanner. The one or more pictures may then be included as the data points 115 and be included into a point cloud of data. The picture data may later be used when rendering the data points 115 as an image. For example, the picture data may be used as background data to fill in gaps not recorded by the laser scan. Alternatively, the picture data may be used to create a more comprehensive view that is easier for the user to understand and interpret. For instance, if the scan was an outdoor scan of a building and its surroundings, then perhaps the sky would not be captured by the laser scan as there would typically be nothing in the sky to cause a reflection of the laser light. In this case, a picture of the sky could overlay the scan data to create the more comprehensive view.

Once the data points 115 have been generated by the laser scanner 110, they may be combined into a single data set in a single coordinate system as a point cloud 125. One typical process for combining the various scans into a single data set in a single coordinate system is the registration process. This process may be performed by the laser scanner 110 or it may be performed by a computer that is coupled to the laser scanner 110. The point cloud 125 may then be stored in a data store 120.

The data store 120 may be any reasonable storage medium capable of storing the point cloud 125, examples of which include, but are not limited to, a database, a file, a file system, volatile and non-volatile memory. In some embodiments, the data store 120 may reside on the computing system that is coupled to the laser scanner 110. In other embodiments, the data store 120 may be housed in a computing system that is connected by the Internet or other wide or local area network to both the laser scanner 110 and to a computing system that runs one or more applications capable of rendering the point cloud 125 as a viewable image. In still further embodiments, the data store 120 may located on the computing system that runs one or more applications capable of rendering the point cloud 125 as a viewable image. Thus, it will be appreciated that the location of data store 120 is not important to the embodiments disclosed herein.

FIG. 1A also shows that environment 100 includes a first viewer 130 and a second viewer 140. The first and second viewers 130 and 140 may be viewable interfaces of a software package configured to render point cloud 125 as the viewable image. For example, the viewers 130 and 140, or at least the software packages that implement the viewers, may be configured to access the point cloud 125 and render the data as the viewable image as will be discussed in more detail to follow. In some embodiments viewers 130 and 140 may be included as part of a single software package or application while in other embodiments the viewers may be part of separate software packages or applications. It will be appreciated that if viewers 130 and 140 are part of separate software packages or applications, they may reside on disturbed computing systems that are connected via any reasonable network. Thus, in this description and in the claims any reference to a viewer is meant to include both the viewable interface and the software packages or applications that implement the viewable interface.

As described, viewers 130 and 140 and their underlying software packages may be configured to render point cloud 125 as a viewable image. In some embodiments, viewer 140 may be configured to render viewable all of the data points of point cloud 125 into an image 145. The viewer 140 may also be configured to allow a user to perform various operations on the rendered image 145.

Figure 2:
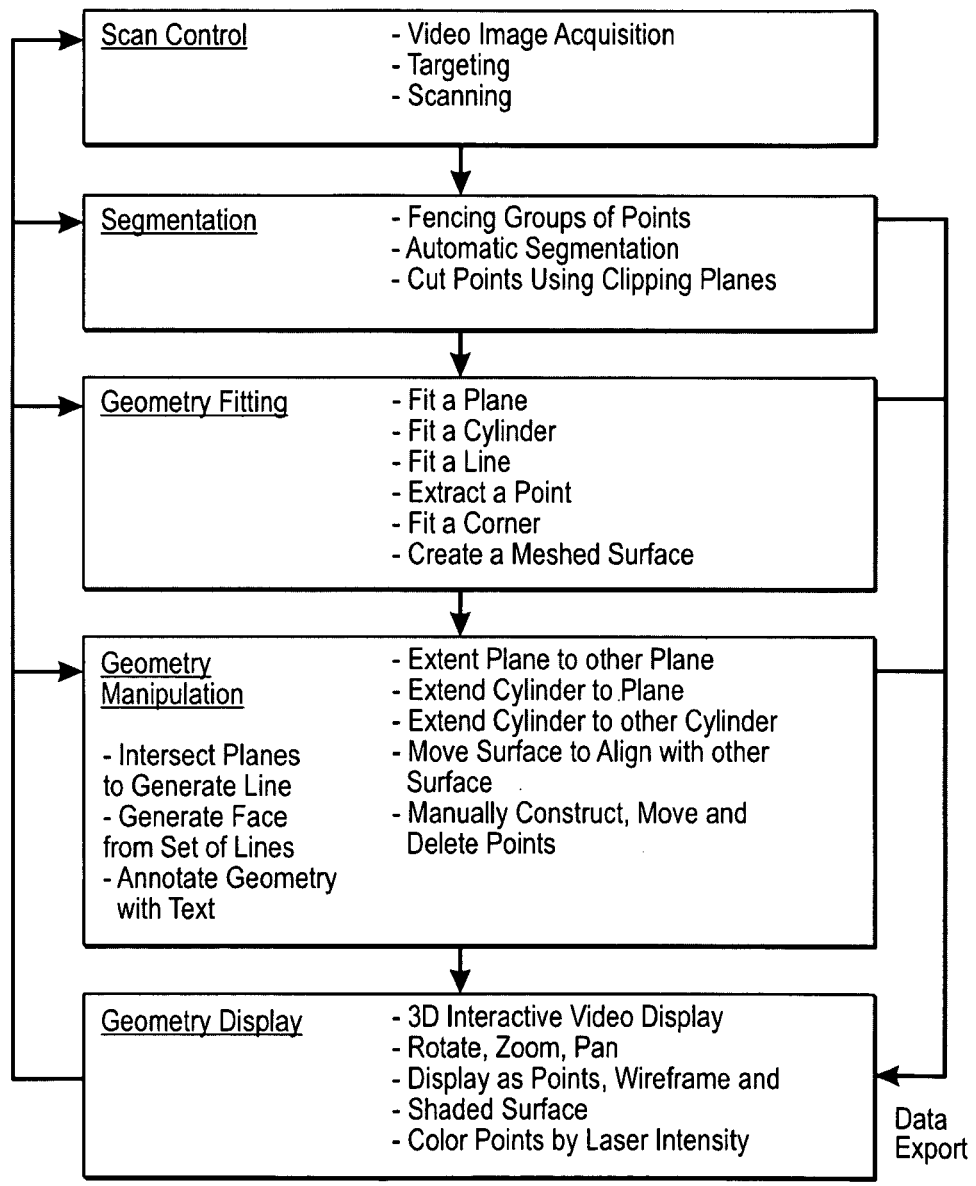
FIG. 2 illustrates various operations that may performed on point cloud data in accordance with the embodiments disclosed herein.

Well known types of operations that may be performed on the point cloud 125 data are shown in FIG. 2, which shows how a user may scan an object, organize the acquired points 115, fit geometric shapes to the organized point, manipulate the fitted geometric shapes, and display the resulted manipulated geometric shapes. Accordingly, the viewer 140 provides a user with the ability to perform numerous actions on the point cloud 125 as circumstances warrant. Well known examples of a viewer 140 include, but are not limited to, Cyclone, CloudWork for AutoCad, CloudWork for Microstation, CloudWork for PDMS, CloudWork for SmartPlant Review, all from Leica Geosystems HDS, LLC, of San Ramon, Calif.

As previously discussed, however, the point cloud 125 may consist of scanned data points from multiple scans taken at multiple locations. When point cloud 125 is then rendered as an image 145 by viewer 140, the resulting image 145 may be very difficult for the user to understand or interpret because data points were collected at different points of view or locations. For example, reference is now made to FIGS. 3A and 4A, which illustrate examples of an image 300 and 400 respectively, which may correspond to image 145, which have been rendered by the viewer 140. As may be seen in these figures, the images 300 and 400 are difficult to interpret as they contain raw point cloud data 125 from multiple scans as well as geometries and the like.

However, even though the rendered image 145 may be difficult to understand, the user will often still need to perform the operations that were previously discussed on the point cloud data of the rendered image. In particular, the user may need to isolate or view a particular portion of the image 145 before performing the operations on the point cloud data.

However, it is often difficult to isolate the desired area because the area is hard to find in large point cloud data sets. For example, referring again to FIGS. 3A and 4A, it is often difficult for a user to view the images 300 and 400 and to find the desired region.

Accordingly, the embodiments disclosed herein provide for a way to easily allow the user to select a region of interest and then to isolate that region such that only the selected region is shown as the rendered image. Referring again to FIG. 1A, a viewer 130 is illustrated. As mentioned, the viewer 130 may be configured to access the point cloud 125 and to render a viewable image 135. The viewer 130, however, is configured to render a "panoramic view" of the image 135. A panoramic view is a simplified view that only includes scans from a single location as seen from the point of view or position of the scanner. That is, the viewer 130 uses, the point of view of the scanner which conducted the scan when rendering image 135. As will be appreciated, using the data points from one or more scans taken from the same scanner position or point of view creates a view from the perspective of the scanner taking the scan. This means that any elements in the scan view that would be occluded from the point of view of the scanner are not be included in the rendered image 135. In other words, if a user were to view the data points for the single scan position at any position other than the scan position, he or she may see elements that are occluded from the viewer's position but were visible to the scanner.

In addition, any scanned pictures may be included in the image as background or to replace missing elements as has been explained. In some embodiments, the viewer 130 allows the user to fit the point data to various geometries. Thus, image 135 is typically a rendering that allows the user to zoom in and out, rotate the image, and to pan around the image as desired.

Accordingly, the resulting image 135 that does not include occluded elements is easy for the user to understand and interpret. An example of a viewer 130 that may render a panoramic view is TruView and TruSpace from Leica Geosystems HDS, LLC, of San Ramon, Calif., although any other viewer capable of rendering a panoramic view may also implement the principles of the embodiments disclosed herein. Additional aspects of an embodiment of a viewer 130 suitable for the embodiments disclosed herein is found in commonly owned, co-pending United States Application Publication No. 2008/0088623 filed Jan. 4, 2007 and which is incorporated herein by reference in its entirety.

Figure 3A:
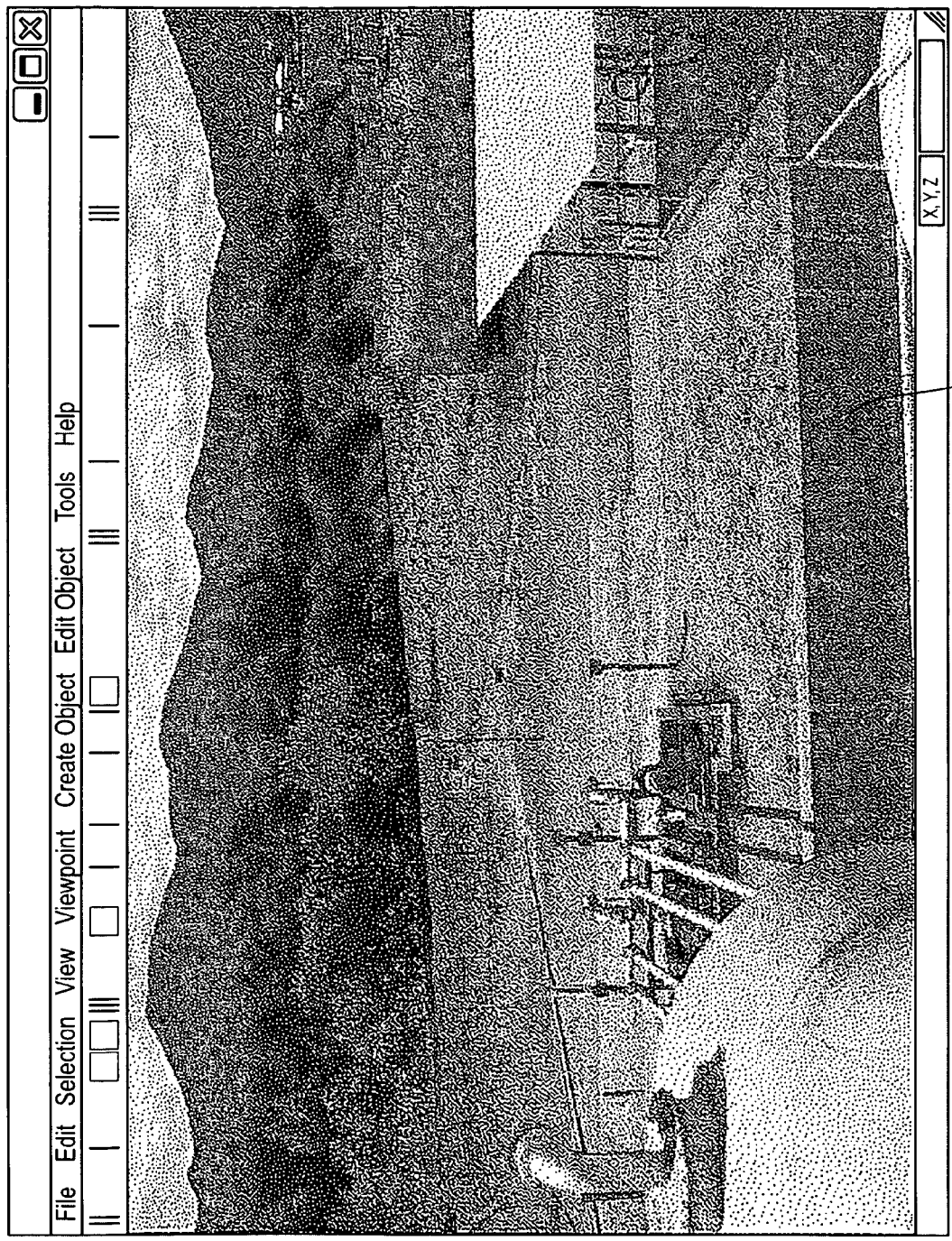
Figure 3B:
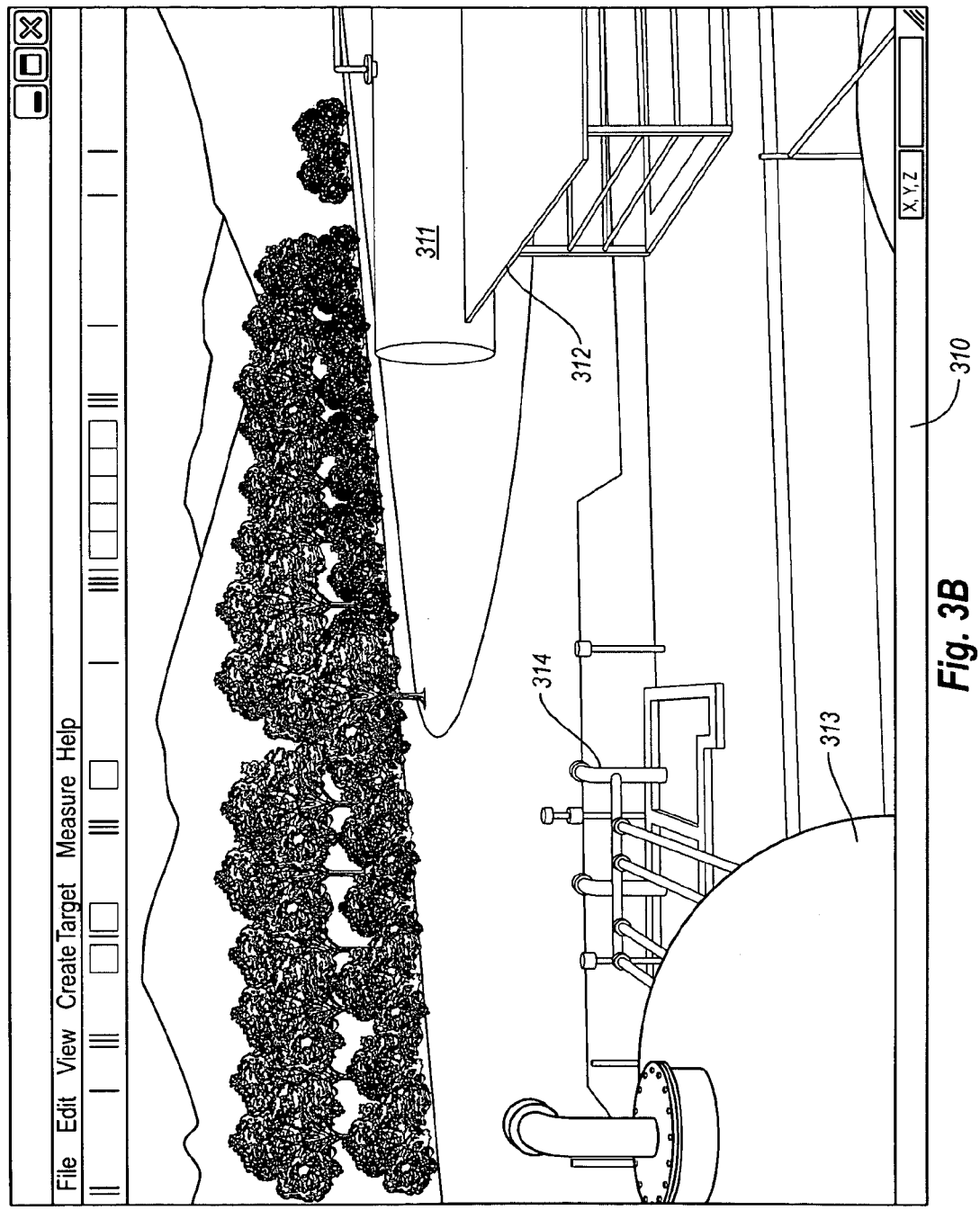

Reference is now made to FIGS. 3B and 4B, which show embodiments of a viewer 130. As shown, FIG. 3B illustrates an image 310 as a view as if the user were viewing the scene illustrated in the image 300 of FIG. 3A from the position or point of view of the scanner. For example, the image 310 includes clearly defined elements 311, 312, 313, and 314 all from the perspective of a user looking across the scene. Further, the image 310 includes photographic overlays including mountains and tress to complete the scene. As will be appreciated, this scene is easily understandable by a user.

In comparison, image 300 of FIG. 3A does not include clearly defined elements. Rather, the image lacks any point of reference for a user to easily view the scene shown in the image 300. In addition, the image 300 includes occluded elements that are not seen in image 310 and also does not include the photographic overlays. In short, it is much more difficult to select a region of interest in image 300 than it is in image 310.

Referring to FIG. 4B, a view of an image 410 is shown from the position or point of view of the scanner. As shown, image 410 clearly shows pipes 412 and a pipe joint 415 as well as other clearly defined elements. As further shown, any occluded elements are not included in the image 410, but rather only those elements that a user would see if viewing the scene from the point of view or position of the scanner.

Figure 4A:
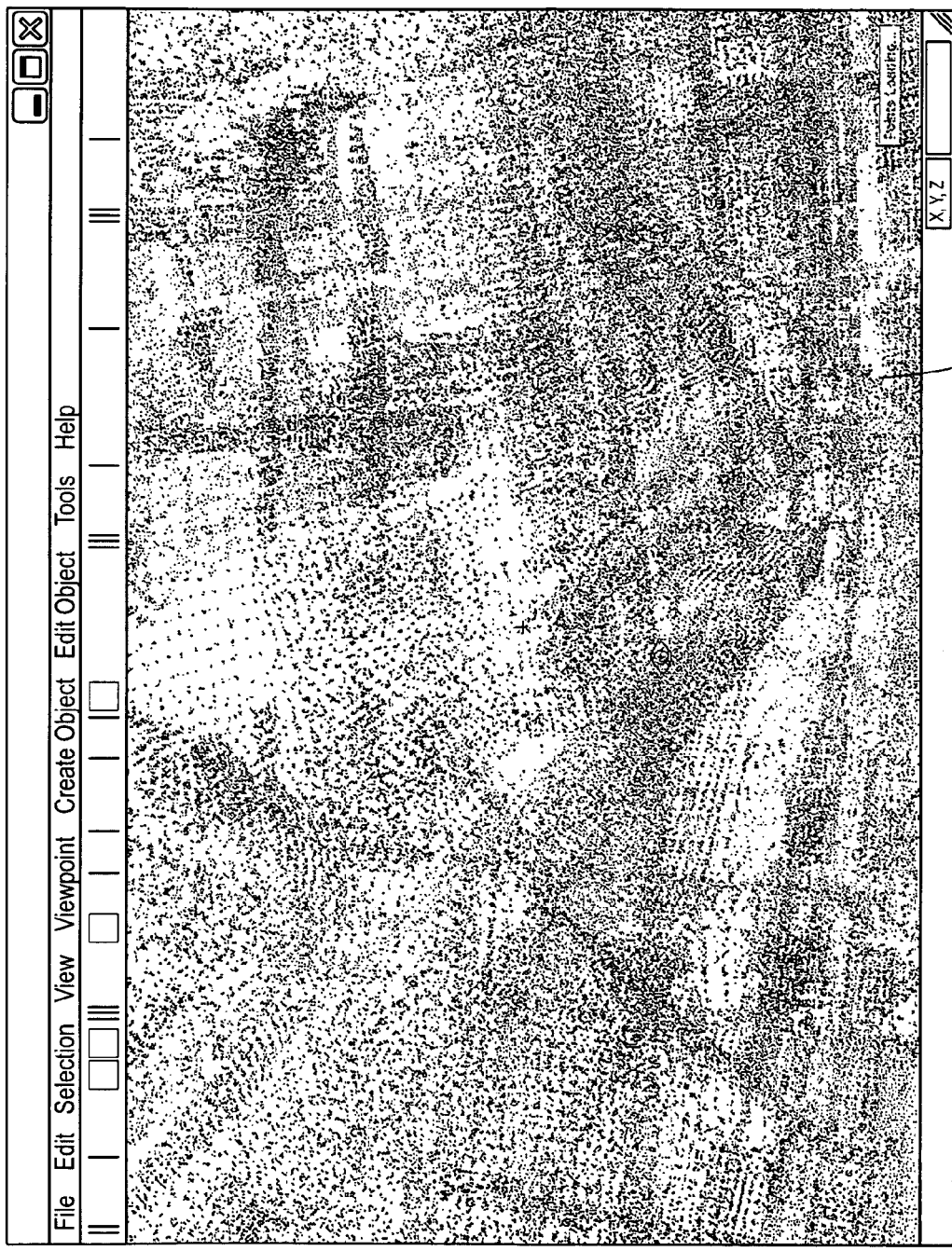

In sharp contrast, the image 400 of FIG. 4A does not include clearly defined elements. Rather, the image lacks any point of reference for a user to easily view the scene shown in the image 400. For example, the pipe 412 and the joint 415 are not easily discernable in the image 410. As mentioned, this is because the image 400 includes all data points of the point cloud 125 regardless of view point and thus includes elements that would be occluded from the view point of image 410. As with image 300, it is much more difficult to select a region of interest in image 400 than it is in image 410. Thus a user would have a fairly easy time selecting joint 415 while viewing image 410, but would have a much more difficult time of selecting the joint 415 while viewing image 400.

As has been mentioned, a user, such as user 150, often desires to select a region of interest in a point cloud image to perform modeling and other operations such as fitting the point data to various geometries. Accordingly, referring again to FIG. 1A, viewer 130 may be configured to allow the user 150 to define a clip volume 160 that may be used to select a region of interest. For example, the user may provide user input 155 via known methods such as with a computer keyboard or a mouse to viewer 130 that defines the size of the clip volume 160. The clip volume 160 may be a cube, a rectangle, a sphere, a cylinder, or any other object of a known size that may define a region of interest. In some embodiments, the clip volume may also be a union, intersection, or difference of multiple known volumes.

Once the clip volume is defined, the user 150 may provide user input 155 that selects a desired point in image 135. For example, the user may select a point 170 by clicking on the image 135 with a computer mouse. As will be appreciated, the point 170 represent a specific data point of the point cloud 125 and has corresponding X, Y, and Z coordinates. Since the coordinate systems of viewers 130 and 140 are the same as previously discussed, the point 170 has a corresponding point with the same X, Y, and Z coordinates in image 145. That is to say, because the images 135 and 145 share the same coordinates, any point that is selected in image 135 will have a corresponding point with the same X, Y, and Z coordinates in image 145.

The selection of the point 170 will then define a region of interest 180. The region of interest 180 will comprise the defined clip volume 160 positioned about the selected point 170. Said another way, the region of interest 180 will take the shape and size that the user defined for clip volume 160 and will include the point 170. In some embodiments, the region of interest 180 will include the clip volume 160 centered about the point 170 as is illustrated in FIG. 1A. In other embodiments, the region of interest may include the clip volume 160 with the point 170 comprising some other location of the clip volume such as a corner of the volume. In still other embodiments, the selected point 170 may comprise the smallest X, the smallest Y, or the smallest Z coordinate in the volume. One of skill will appreciate that the selected point 170 may be placed virtually anywhere within the clip volume and serves as a way for the user 150 to quickly and easily select a desired portion of image 135.

It will be appreciated that in some embodiments, the user 150 may define the clip volume 160 at a time prior to making the selection of point 170. In such embodiments, the clip volume 160 will be automatically applied to the region of interest any time the selection of point 170 is made. In other embodiments, the user 150 may define the clip volume 160 at the time the selection of point 170 is made. For example, the viewer 130 may include a user interface that pops-up whenever a point 170 is selected that allows the user 150 to define the volume. In still other embodiments, the viewer 130 may include one or more predefined volumes 160 that the user 150 need simply select when needed.

As previously described, part of the image 135 may include photographic overlays that are used to fill in missing point data. As will be appreciated, if the user were to select point 170 in a region where there was no point data, then the region of interest 180 could not be defined. Accordingly, in some embodiments viewer 130 may include dimming or other similar capabilities that dim those portions of image 135 that do not include actual point data. In this way, the user 150 is informed of what portions of the image 135 may be used to define the region of interest 180.

In any event, once defined, the region of interest 180 acts as a clipping filter for the image 145 that is rendered in viewer 140 as will now be explained. As shown in FIG. 1A, the defined region of interest 180 is accessed by or provided to viewer 140. The region of interest 180 then causes the rendered image 145 to be updated so that only the portion of image 145 that corresponds to the region interest 180 (i.e., the region defined by clip volume 160 and including the selected point 170) is displayed. This is illustrated in FIG. 1A by hashed lines 185. As mentioned, since the images 135 and 145 share a coordinate system, the displayed portion of image 145 will have coordinates that correspond to the selected portion of image 135. The portions of image 145 that are displayed may then be manipulated by user 150 as previously discussed.

As will be appreciated, the portion of image 145 corresponding to the region of interest 180 will typically include raw point cloud data and may include geometries that have been creating using the raw point cloud data. In one embodiment, all point cloud data and any geometries are automatically included in the portion of image 145 corresponding to the region of interest 180. However, in alternative embodiments, the user 150 may specify what type of data to include in the portion of image 145 corresponding to the region of interest 180. For example, the user may specify that only raw point cloud data be included in the region of interest. Alternatively, the user may specify that only existing geometries be included in the region of interest. One of skill in the art will appreciate that the user may also specify other combinations of data to include in the region of interest as circumstances warrant.

Figure 3C:
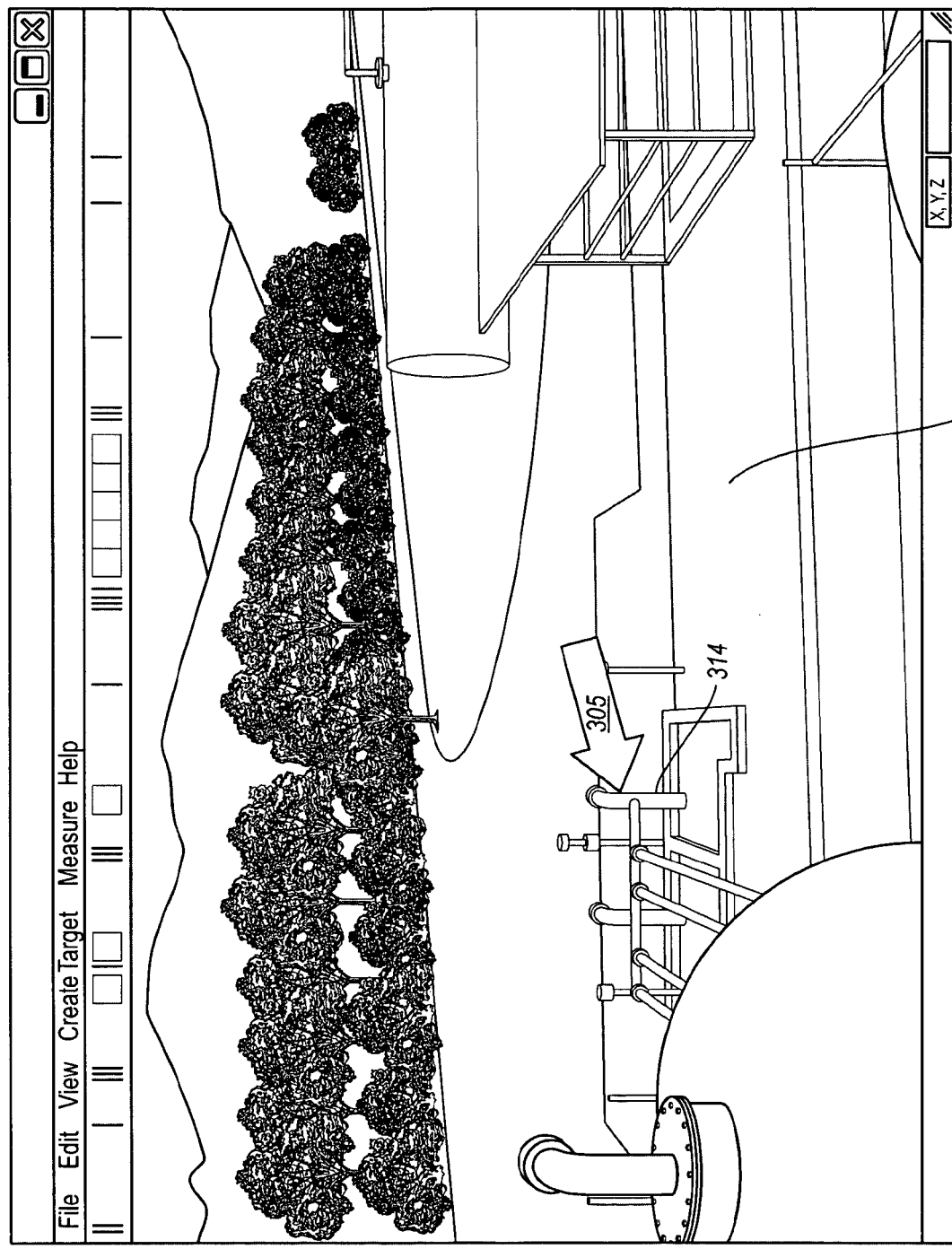

Reference is now made to FIGS. 3C and 3D, which further illustrate the selection of a region of interest. As mentioned, the user 150 will define the clip volume 160, which in this case may be a cube, and the user may then select a point 170 to define the region of interest 180. As shown in FIG. 3C, the user may select a point around the element 314 of image 310 as illustrated by the arrow 305.

FIG. 3D shows the effect of defining the region of interest on image 300. As illustrated, image 400 now only displays a defined region of interest 330. The defined region of interest 330 includes data included with a cubic clip volume centered on the point 305. In this particular case, the point cloud data within the region 330 corresponds to the element 314 of image 310. The user may then easily navigate in full three-dimension ("3D") around the more limited set of points and may perform operations on the points as needed.

Figure 4C:
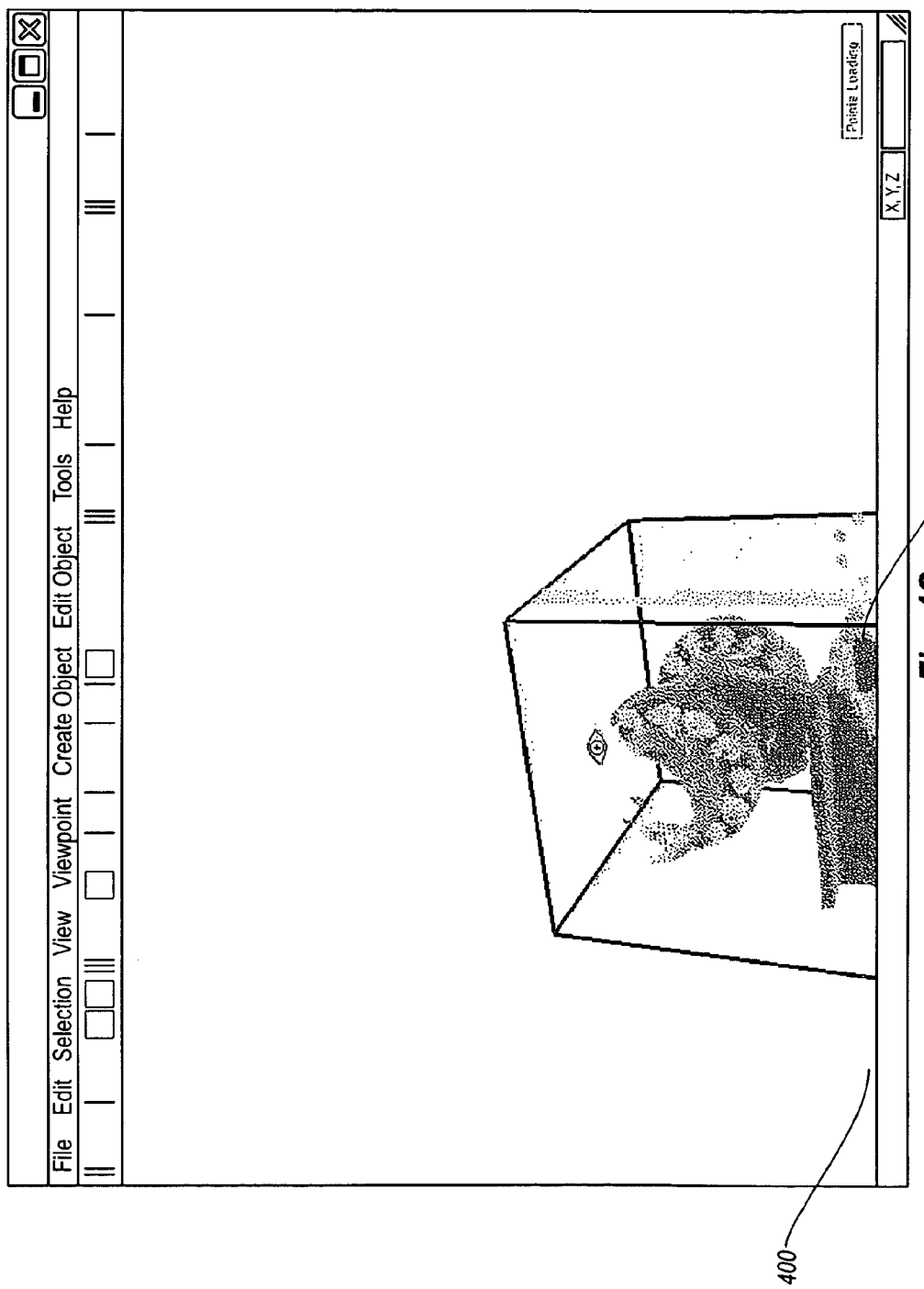

Likewise, FIG. 4C illustrates the effect of defining the region of interest on image 400. As shown in FIG. 4C, image 400 has been updated to only display data included in a region of interest 430. In this case, the region of interest 430 is a cubic clip volume centered about the element 415 of image 410. As mentioned, point cloud data and existing geometries within the region 430 may be included. The user may then navigate in 3D and perform operations as needed.

Figure 1B:
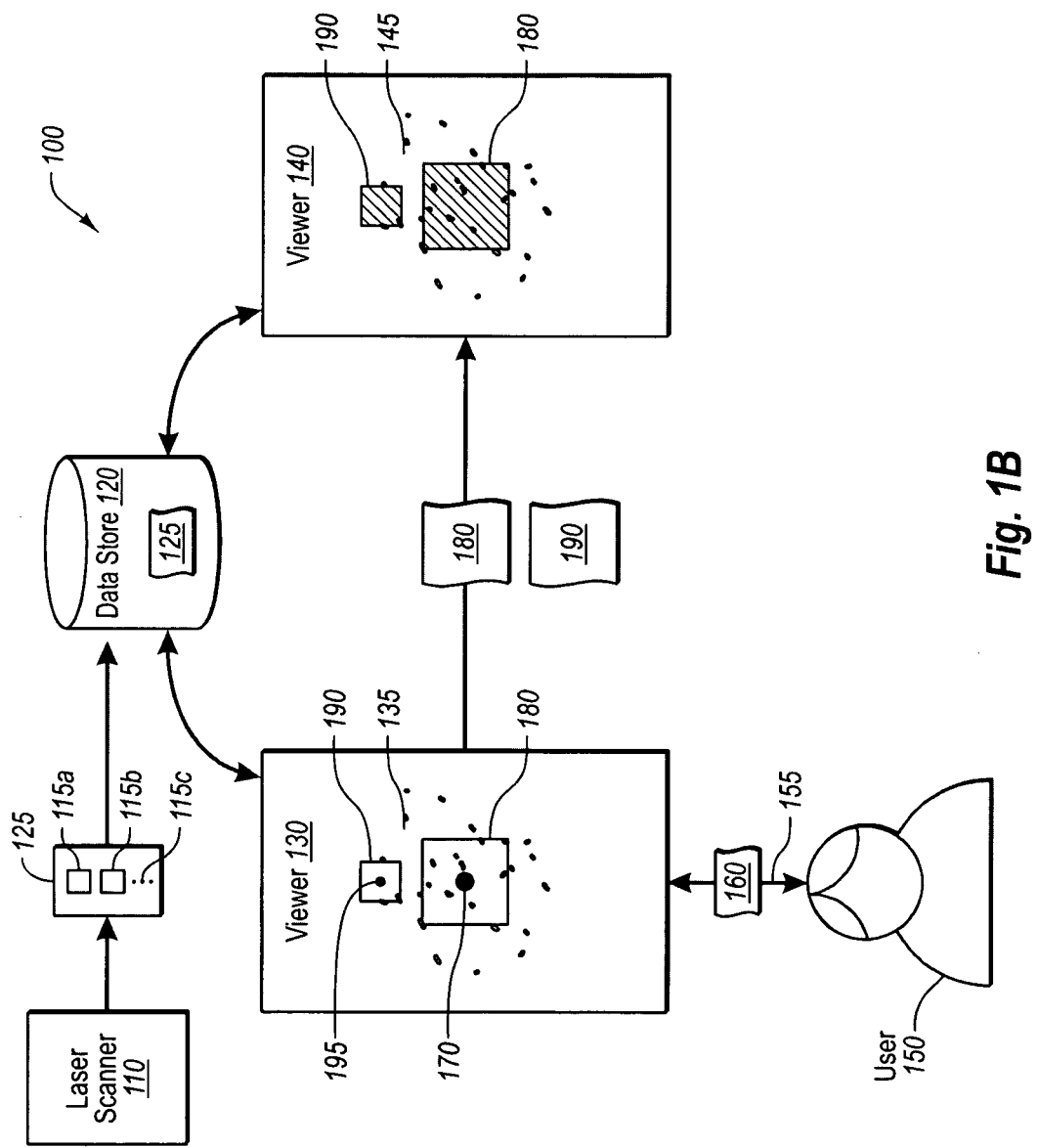
FIG. 1B illustrates additional details of the environment of FIG. 1A.

Referring now to FIG. 1B, additional features of the embodiments disclosed herein are illustrated. As discussed above in relation to FIG. 1A, the user 150 may specify a clip volume 160 that is used to define a region of interest 180 when a point 170 is selected. In some embodiments, the user may define more than one region of interest. As shown in FIG. 1B, the user 150 may also desire to view additional portions of image 145. Accordingly, the user may, in addition to defining the region of interest 180, define an additional region of interest 190. This region is defined when the user selects a point 195 in the image 135. The X, Y, Z coordinates of point 195 then are included within the region of interest 190, which includes all of the point cloud data, geometries, and the like included within the clip volume 160. Both of the regions of interest 180 and 190 are then transferred to image 145, which is updated to only display the point cloud data and/or geometries within the regions of interest. Accordingly, the embodiments disclosed herein allow the user to define more than one region of interest in the viewer 135 and then to use the region as a filter in image 145. In this way, the user is not limited to only one region of interest.

It will be appreciated that although FIG. 1B shows two regions of interest, the user may cause the viewer 130 to define any number of additional regions of interest as circumstance warrant. In addition, the additional regions of interest need not all have the same volume. That is, although FIG. 1B shows the regions of interest 180 and 190 both having the same volume, in this case cubic, in some embodiments the user 150 may define a separate clip volume 160 for each desired region of interest. For example, the user may define a cubic clip volume for the region of interest 180 and a spherical clip volume for the region of interest 190. Thus, the user is able to specify multiple different volumes or even the same type of clip volume but of a different size as needed.

It will also be appreciated that although the above discussion of FIG. 1 implied that both viewers 130 and 140 were both open during the process of defining the region of interest 180, this need not be the case. For example, in some embodiments the viewer 140 is not opened while the user 150 defines the clip volume 160 and selects the point 170 in viewer 130. In such embodiments, as the region of interest 180 is defined, the viewer 140 is caused to be opened and to display only that portion of image 145 that is within the region of interest 180.

Figure 5:
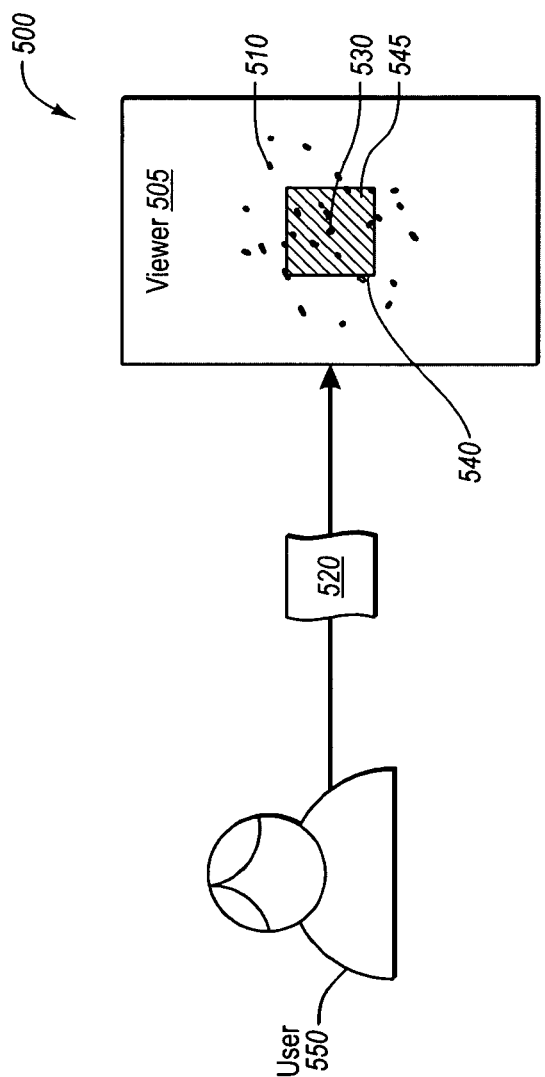
FIG. 5 illustrates an alternative environment in which embodiments of the present invention may be practiced.

Reference is now made to FIG. 5, which shows an environment 500 that may be used to implement additional embodiments disclosed herein. As illustrated, the environment 500 includes a viewer 505. The viewer 505 is configured to access point cloud data from multiple scans recorded by a laser scanner and to render the data as an image 510. The viewer 505 is further configured to use the point cloud data to generate various geometries. Further, the viewer 505 is configured to allow a user 550 to perform the various operations discussed above in relation to FIG. 3. Thus, the viewer 505 may correspond to the viewer 130 or 140 previously discussed.

When the user 550, desires to select a region of interest in a point cloud image to perform modeling and other operations the user may define a clip volume 520 in viewer 505 that may be used to select a region of interest. For example, the user may provide user input 555 via known methods such as with a computer keyboard or a mouse to viewer 505 that defines the size and shape of the clip volume 520. The clip volume 520 may be a cube, a rectangle, a sphere, a cylinder, or any other object of a known size that may define a region of interest. As discussed previously, the clip volume 520 may be defined prior to selecting point 530 or it may be defined when the point is selected.

Once the clip volume is defined, the user 550 may provide user input 555 that selects a desired point of interest in image 310. For example, the user may select a point 530, which represents a specific data point of the point cloud 125 and has corresponding Z, Y, and Z coordinates. The selection of the point 530 will then define a region of interest 540. The region of interest 540 will comprise the defined clip volume 520 centered about the selected point 530 in one embodiment and in other embodiments will include the selected point 530 positioned somewhere within the volume.

Unlike the embodiments discussed in relation to FIG. 1A, however, the defined region of interest 540 is not provided to a different viewer. Rather, once defined, the region of interest 540 acts as a clipping filter for the image 510. The region of interest 540 then causes the rendered image 510 to be updated by the viewer so that only the portion of image 510 that corresponds to the region interest 540 (i.e., the region centered around point 530 and defined by clip volume 520) is displayed. This is illustrated in FIG. 5 by hashed lines 545. The portions of image 510 that are displayed may then be manipulated by user 550.

Reference is again made to FIG. 1A. As mentioned previously, viewer 130 renders an image 135 that is generally easier for a user to understand and interpret. The image 135 is typically a spherical rendering that allows the user to zoom in and out, rotate the image, and to pan around the image as desired. Accordingly, the image 135 is updated to reflect that the image has been zoomed in or out of, rotated, or panned around in.

In some embodiments, the principles of the present invention allow the user to synchronize the zooming, panning, and rotating of image 135 with the image 145 of viewer 140. For example, in such embodiments when the image 135 is updated because of zooming, panning, or rotating as described, this information is sent to viewer 140. In response, viewer 140 causes that image 145 is also zoomed in or out of, panned around in, or rotated in a way that matches the action performed on image 135. In other words, image 145 is updated to match the updated image 135 so that the viewpoint of each image is synchronized. Advantageously, this allows the use of the easier to understand image 135 to control the viewpoint in the harder to understand image 145.

Figure 6:
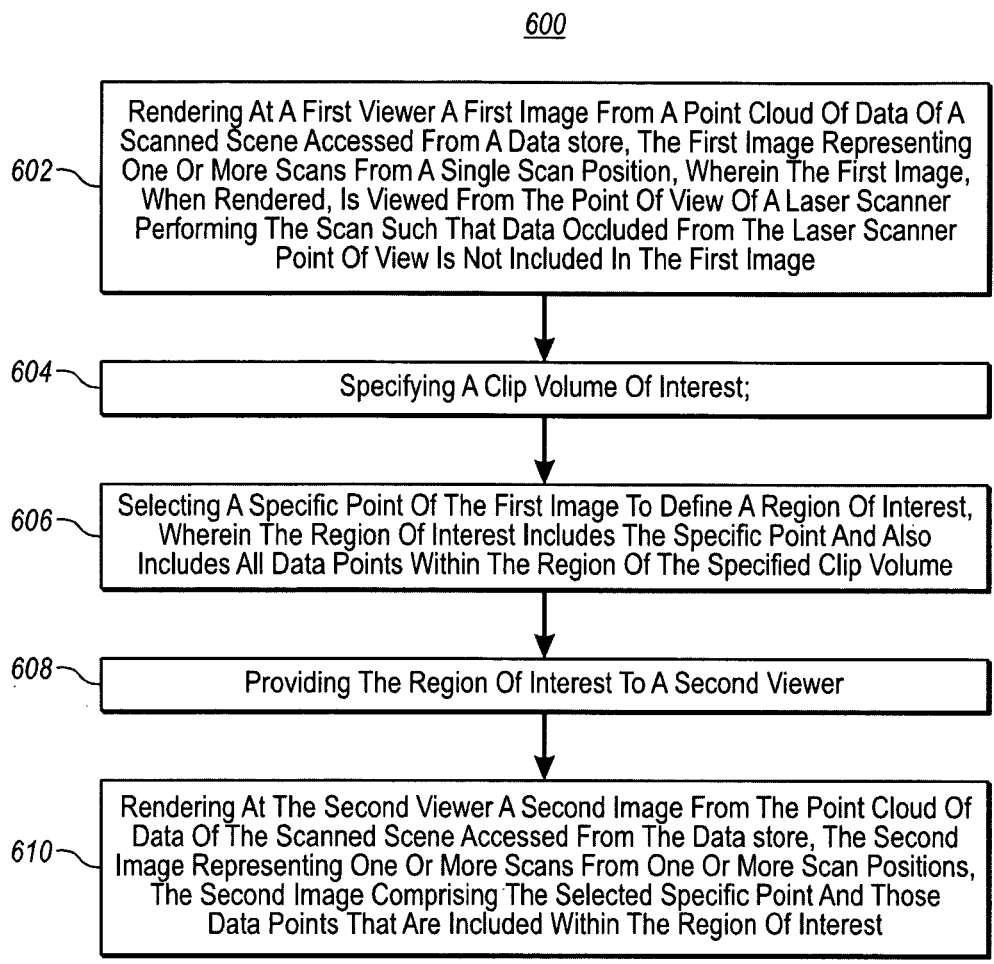
FIG. 6 illustrates an flowchart of method for defining a clip region of the image of a second viewer using the image of a first viewer in accordance with the embodiments disclosed herein.

Reference is now made to FIG. 6, which illustrates a flowchart of a method 600 for defining a clip region of the image of a second viewer using the image of a first viewer. The method may be practiced in a system that includes the first viewer and the second viewer configured to render point cloud data collected from a laser scan as a viewable image. The method will now be explained in relation to the system of FIGS. 1A and 1B. Note however, that the system of FIGS. 1A and 1B is only one of many systems that may implement the method 600.

The method 600 includes rendering 602 at a first viewer a first image from a point cloud of data of a scanned scene accessed from a data store, the first image representing one or more scans from a single scan position, wherein the first image, when rendered, is viewed from the point of view of a laser scanner performing the scan such that data occluded from the laser scanner point of view is not included in the first image. For example, the viewer 130 may render the image 135 from the point cloud 125 that is stored in data store 120. As mentioned, the image 135 is comprised of data points from a single scan at a single point of view or location. Accordingly, any data that is occluded from the single point of view is not included in the image 135.

The method 600 also includes specifying 604 a clip volume and selecting 606 a specific point of the first image to define a region of interest, wherein the region of interest includes the specific point and also includes all data points within the region of the specified volume. For example, in some embodiments the viewer 130 may receive input from the user 150 that defines a clip volume 160, which may be a cube, rectangle, sphere, cylinder, or any other definable shape. Input is also received that selects a specific point of the image, such as point 170. A region of interest 180 is then defined that is centered on the selected point 170 in some embodiments and may include the selected point 170 at another position in the clip volume in other embodiments and includes all the data within the clip volume 160.

The method 600 further includes providing 608 the region of interest to a second viewer and rendering 610 at the second viewer a second image from the point cloud of data of the scanned scene accessed from the data store, the second image representing one or more scans from one or more scan locations, the second image comprising those the selected point and those data points that are included within the region of interest. For example, the region of interest 180 may be provided to the viewer 140. The viewer 140 renders a second image of the scanned scene from the point cloud 125 stored in data store 120. As previously described, the image 145 includes data from multiple scan locations. Accordingly, the image 145 may include data that is viewable from one scan point of view but is occluded from another scan point of view.

In some embodiments, the image 145 is rendered prior to receiving the region of interest 180 and is updated to only display those data point of point cloud 125 within the region of interest 180. In other embodiments the image 145 is rendered at the time the region of interest is received to only include those data points of point cloud 125 that are included in the region of interest 180. Regardless, the user 150 may then perform various operations on the image 145.

In some embodiments, a second region of interest such as region of interest 190 may also be defined. The region of interest 190 may also be defined by receiving input that defines a clip volume 160 and selects a point 195. The image 145 will then be rendered or updated to only display the data within the regions of interest 180 and 190 as explained. In some embodiments the volumes of the regions of interest may be the same or they may be different.

Figure 7:
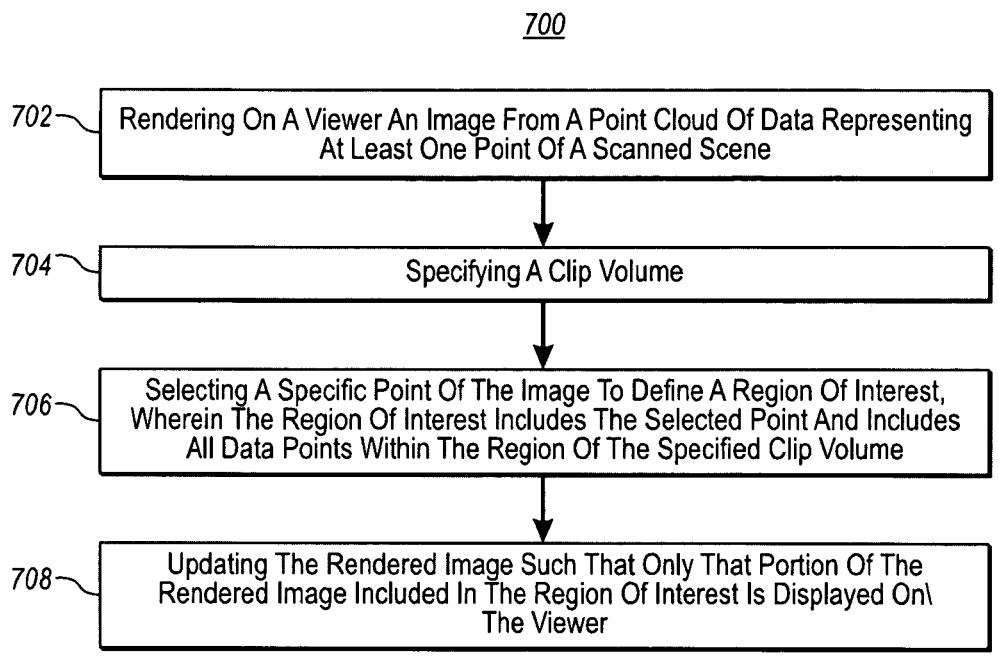
FIG. 7 illustrates a flowchart of method for defining a clip region of a viewer in accordance with the embodiments disclosed herein.

Reference is now made to FIG. 7, which illustrates a flowchart of a method 700 for defining a clip region. The method may be implemented in a system that includes a viewer configured to render point cloud data from a laser scanner as a viewable image. The method will now be explained in relation to the system of FIG. 5. Note however, that the system of FIG. 5 is only one of many systems that may implement the method 700.

The method 700 includes rendering 702 on a viewer an image from a point cloud of data representing at least one point of a scanned scene. For example, the image 510 may be rendered from point cloud 125 by the viewer 505.

The method 700 also includes specifying 704 a clip volume and selecting 706 a specific point of the image to define a region of interest, wherein the region of interest includes the selected point and includes all data points within the region of the specified clip volume. For example, in some embodiments the viewer 505 may receive input from the user 550 that defines a clip volume 520, which may be a cube, rectangle, sphere, cylinder, or any other definable shape. Input is also received that selects a specific point of the image 510, such as point 530. A region of interest 540 is then defined that is centered on the selected point 530 and includes all the data within the clip volume 520.

The method 700 further includes updating 708 the rendered image such that only that portion of the rendered image included in the region of interest is displayed on the viewer. For example, the viewer 505 may update the image 310 so that only those portions included within the region of interest 740 are included as is illustrated by the hashed area 745.

Embodiments herein may comprise a special purpose or general-purpose computer including various computer hardware. Portable media devices are examples of special purpose computers. Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a system that includes a first viewer and a second viewer configured to render point cloud data collected from a laser scan as a viewable image, a method for defining a clip region of the image of the second viewer using the image of the first viewer, the method comprising:
    rendering at a first viewer a first image of point cloud data of a scanned scene accessed from a data store, the first image representing one or more scans from a single scan position, wherein the first image, when rendered, is viewed from the point of view of a laser scanner performing the scan at the single scan position such that occluded from the laser scanner point of view at the single scan position is not included in the first image;
    specifying a clip volume to be applied to the first image of the first viewer;
    selecting a specific point of the first image to define a region of interest, wherein the region of interest includes the specific point and also includes all data points within the region of the specified clip volume;
    providing the region of interest to a second viewer; and
    rendering at the second viewer a second image from the point cloud data of the scanned scene accessed from the data store, the second image representing one or more scans from two or more scan positions, the second image comprising the selected specific point and those data points that are included within the region of interest as well as the occluded data from the laser scanner point of view at the single scan position not included in the first image that is included within the region of interest.

2. The method in accordance with claim 1, wherein the region of interest is centered at the selected point and includes all data points within the region of the specified clip volume.

3. The method in accordance with claim 1, wherein the selected point is included in the region of interest at a location other than the center of the region of interest.

4. The method in accordance with claim 1, wherein the clip volume is one of a cube, rectangle, sphere, or cylinder.

5. The method in accordance with claim 1, wherein the clip volume is specified at a time prior to when the region of interest is defined.

6. The method in accordance with claim 1, wherein the clip volume is specified at a time when the region of interest is defined.

7. The method in accordance with claim 1, wherein the data points of the second image included in the region of interest include at least both point cloud data and one or more geometries fitted from the point cloud data.

8. The method in accordance with claim 1, wherein the data points of the second image included in the region of interest include point cloud data only.

9. The method in accordance with claim 1, wherein the data points of the second image included in the region of interest include only geometries fitted from point cloud data.

10. The method in accordance with claim 1, wherein the first viewer is part of a first software application and the second viewer is part of a second software application.

11. The method in accordance with claim 1, wherein the first and second viewers are part of the same software application.

12. The method in accordance with claim 1, wherein the region of interest is a first region of interest, the method further comprising:
selecting a second clip volume;
selecting a second specific point of the first image to define a second region of interest, wherein the second region of interest includes the second specific point and also includes all data points within the region of the second specified clip volume;
providing the second region of interest to the second viewer; and
rendering at the second viewer the second image, wherein the second image comprises those data points that are included within the first region of interest and the second region of interest.

13. The method in accordance with claim 12, wherein the first and second specified clip volumes are one of a cube, rectangle, sphere, or cylinder.

14. The method in accordance with claim 12, wherein the wherein the first and second specified clip volumes are of a different shape and/or size.

15. The method in accordance with claim 1 further comprising:
zooming, panning, or rotating the first image to create an updated view of the first image; and
in response, updating the second image to match the updated view of the first image.

16. In a system that includes a viewer configured to render point cloud data from a laser scanner as a viewable image, a method for defining a clip region, the method comprising:
rendering on a viewer an image from a point cloud of data representing at least one point of a scanned scene, the first image representing one or more scans from a single scan position, wherein the first image, when rendered, is viewed from the point of view of a laser scanner performing the scan at the single scan position such that data occluded from the laser scanner point of view at the single scan position is not included in the first image;
specifying a clip volume to be applied to the first image of the first viewer;
selecting a specific point of the image to define an region of interest, wherein the region of interest includes the selected point and includes all data points within the region of the specified clip volume; and
updating the rendered image such that only that portion of the rendered image included in the region of interest is displayed on the viewer, wherein the updated rendered image represents one or more scans from two or more scan positions, the second image comprising the selected specific point and those data points that are included within the region of interest as well as the occluded data from the laser scanner point of view at the single scan position not included in the first image that is included within the region of interest.

17. The method in accordance with claim 16, wherein the region of interest is centered at the selected point and includes all data points within the region of the specified clip volume.

18. The method in accordance with claim 16, wherein the clip volume is one of a cube, rectangle, sphere, or cylinder.

19. The method in accordance with claim 16, wherein the clip volume is specified at a time prior to when the region of interest is defined.

20. The method in accordance with claim 16, wherein the clip volume is specified at a time when the region of interest is defined.

21. The method in accordance with claim 16, wherein the data points of the updated image included in the region of interest include at least both point cloud data and one or more geometries fitted from the point cloud data.

22. The method in accordance with claim 16, wherein the data points of the updated image included in the region of interest include point cloud data only.

23. The method in accordance with claim 16, wherein the data points of the updated image included in the region of interest include only geometries fitted from point cloud data.

24. The method in accordance with claim 16, wherein the image includes background picture data and wherein the background picture data is dimmed in relation to actual point cloud data included in the image.

25. A system for rendering images from point cloud data collected in a laser scan comprising:
a data store configured to store point cloud data of a scene collected by a laser scanner;
a first viewer configured to render a first image of the point cloud data stored in the data store, the first image representing one or more scans from a single scan position, wherein the first image, when rendered, is viewed from the point of view of a laser scanner performing the scan at the single scan position such that data occluded from the laser scanner point of view at the single scan position is not included in the first image; and
a second viewer configured to render a second image of the point cloud data stored in the data store, the second image representing one or more scans from two or more scan positions;
wherein defining a region of interest by receiving input that specifies a clip volume in the first viewer that specifies a portion of the first image causes the second viewer to render the second image such that the second image only includes data that is within the region of interest as well as the occluded data from the laser scanner point of view at the single scan position not included in the first image that is included within the region of interest.

26. The system in accordance with claim 25, wherein defining a region of interest in the first viewer comprises:
receiving input that selects a specific point of the first image, wherein the region of interest is centered at the selected point and includes all data points within the region of the specified clip volume.

27. The system in accordance with claim 25, wherein the second viewer is opened at the time the region of interest is defined.

28. The system in accordance with claim 25, wherein the second viewer is opened prior to the time the region of interest is defined.

* * * * *